(12) United States Patent
Benisti

(10) Patent No.: US 11,000,041 B2
(45) Date of Patent: May 11, 2021

(54) DISINFECTANT FOR DRINKABLE WATER, FOOD CONTACT, INDUSTRY, SPAS, SWIMMING POOLS AND AIR STERILIZATION

(71) Applicant: Int'l Capital Investment LLC, Plantation, FL (US)

(72) Inventor: Alexander Benisti, Sunrise, FL (US)

(73) Assignee: Int'l Capital Investment LLC, Plantation, FL (US)

( * ) Notice: Subject to any disclaimer, the term of this patent is extended or adjusted under 35 U.S.C. 154(b) by 0 days.

(21) Appl. No.: 15/747,394

(22) PCT Filed: Aug. 5, 2016

(86) PCT No.: PCT/US2016/045847
§ 371 (c)(1),
(2) Date: Jan. 24, 2018

(87) PCT Pub. No.: WO2017/024251
PCT Pub. Date: Feb. 9, 2017

(65) Prior Publication Data
US 2018/0360047 A1    Dec. 20, 2018

Related U.S. Application Data

(60) Provisional application No. 62/201,787, filed on Aug. 6, 2015.

(51) Int. Cl.
*A01N 59/08* (2006.01)
*A01N 25/22* (2006.01)
(Continued)

(52) U.S. Cl.
CPC .......... *A01N 59/08* (2013.01); *A01N 25/22* (2013.01); *A01N 25/26* (2013.01); *C02F 1/76* (2013.01);
(Continued)

(58) Field of Classification Search
CPC ........ A01N 59/08; A01N 25/22; A01N 25/26; A01N 59/02; A01N 59/04; A01N 59/14;
(Continued)

(56) References Cited

U.S. PATENT DOCUMENTS 5,281,412 A    1/1994  Lukacovic et al.
5,719,100 A *  2/1998  Zahradnik .............. A01N 59/00
                                                    210/501
(Continued)

FOREIGN PATENT DOCUMENTS

BR    201101756 A2 *  6/2013
CN    101228868 A     7/2008
(Continued)

OTHER PUBLICATIONS

International Search Report; dated Nov. 1, 2016 for PCT Application No. PCT/US2016/045847.

*Primary Examiner* — Hong Yu
(74) *Attorney, Agent, or Firm* — Mendelsohn Dunleavy, P.C.

(57) ABSTRACT

A tablet composition is provided that comprises a core encapsulated by a coating. The core comprises at least one metal chlorite dispersed in a composite matrix and an effervescent agent, and the coating comprises an acid source. The tablet composition can producing chlorine dioxide upon contacting with water, where the chlorine dioxide is retained in the water for an extended period to provide prolonged disinfecting effects. Compositions in powder form are also provided.

5 Claims, 2 Drawing Sheets

Chlorine Dioxide Chemical Stability Over 8 hours

*An additional reading was taking at 1,440 minutes (24 Hours) and read as 1142 ppm.

(51) Int. Cl.
*A01N 25/26* (2006.01)
*C02F 1/76* (2006.01)
*A01N 59/02* (2006.01)
*A01N 59/04* (2006.01)
*A01N 59/14* (2006.01)
*A01N 59/26* (2006.01)
*C02F 103/42* (2006.01)

(52) U.S. Cl.
CPC .............. *A01N 59/02* (2013.01); *A01N 59/04* (2013.01); *A01N 59/14* (2013.01); *A01N 59/26* (2013.01); *A01N 2300/00* (2013.01); *C02F 2103/42* (2013.01); *C02F 2303/04* (2013.01)

(58) Field of Classification Search
CPC ....... A01N 59/26; A01N 2300/00; C02F 1/76; C02F 2103/42; C02F 2303/04
See application file for complete search history.

(56) References Cited

U.S. PATENT DOCUMENTS

| | | |
|---|---|---|
| 6,287,551 B1 | 9/2001 | Ratcliff |
| 6,432,322 B1 | 8/2002 | Speronello et al. |
| 6,479,037 B1 | 11/2002 | Montgomery |
| 6,551,518 B2 | 4/2003 | Gargas |
| 6,602,442 B1 | 8/2003 | Pitochelli |
| 6,699,404 B2 | 3/2004 | Speronello et al. |
| 7,150,854 B2 * | 12/2006 | Koermer ................ C01B 11/024 422/37 |
| 7,514,019 B2 * | 4/2009 | Martin ................... A01N 37/42 252/186.25 |
| 7,666,384 B2 | 2/2010 | Sanderson |
| 7,875,238 B2 | 1/2011 | Koermer et al. |
| 8,262,929 B2 | 9/2012 | Speronello et al. |
| 8,524,201 B2 | 9/2013 | Speronello et al. |
| 8,673,297 B2 | 3/2014 | Speronello et al. |
| 2005/0155936 A1 | 7/2005 | Martin et al. |
| 2005/0155937 A1 * | 7/2005 | Zawada ................ A01N 33/12 210/758 |
| 2006/0088498 A1 * | 4/2006 | Martin ................ A01K 1/0152 424/76.1 |
| 2010/0323009 A1 | 12/2010 | Martin |
| 2011/0027330 A1 * | 2/2011 | Martin ................... A01N 37/42 424/408 |
| 2011/0189112 A1 | 8/2011 | Full |
| 2013/0017241 A1 | 1/2013 | Andrews et al. |

FOREIGN PATENT DOCUMENTS

| | | | |
|---|---|---|---|
| CN | 104232855 A1 * | 12/2014 | |
| WO | WO2007079287 A2 | 7/2007 | |
| WO | WO2013006678 A2 | 1/2013 | |

* cited by examiner

DISINFECTANT FOR DRINKABLE WATER, FOOD CONTACT, INDUSTRY, SPAS, SWIMMING POOLS AND AIR STERILIZATION

BACKGROUND OF THE INVENTION

Field of the Invention

The present invention relates to a composition for generating chlorine dioxide in an aqueous media. In particular, the invention is directed to a tablet composition for generating chlorine dioxide upon contact with water.

Description of the Related Technology

Chlorine dioxide ($ClO_2$) is a neutral compound of chlorine in the +IV oxidation state. Chlorine dioxide is a relatively small, volatile, and highly energetic molecule, and can be converted to a free radical in dilute aqueous solution. Chlorine dioxide is a known bactericidal, algaecidal and fungicidal compound. Therapeutic and cosmetic applications for chlorine dioxide are also known. For example, U.S. Pat. No. 6,287,551 discusses the use of chlorine dioxide solutions for treatment of Herpes virus infection. U.S. Pat. No. 5,281,412 describes chlorite and chlorine dioxide compositions for dental application, which provide antiplaque and anti-gingivitis effects without staining patients' teeth.

Chlorine dioxide destroys microorganism cells by oxidation, but not chlorination. Chlorine dioxide functions as a highly selective oxidant due to its unique, one-electron transfer mechanism whereby is reduced to chlorite ion ($ClO_2^-$). The pKa for the chlorite ion/chlorous acid equilibrium is extremely low (pH 1.8). This is remarkably different from the hypochlorite/hypochlorous acid equilibrium, which occurs proximate a neutral pH. The low pH equilibrium for chlorite ion/chlorous acid indicates that the chlorite ion will exist as the dominant species in drinking water that has a pH close to neutral (e.g. pH 6-8).

One of the most important physical properties of chlorine dioxide is its excellent solubility in water, particularly in chilled water. In contrast to chlorine gas which is typically hydrolyzed in water, chlorine dioxide in contact with water does not hydrolyze to any appreciable extent but is predominately present in solution as a dissolved gas. Traditional methods for preparing chlorine dioxide involve reacting sodium chlorite with gaseous chlorine ($Cl_2(g)$), hypochlorous acid (HOCl), or hydrochloric acid (HCl). These reactions are as follows:

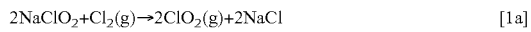  [1a]

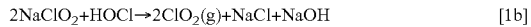  [1b]

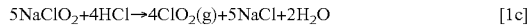  [1c]

Reactions [1a] and [1b] progress at much greater rates in an acidic medium. As a result, nearly all traditional chlorine dioxide generation products yield an acidic solution having a pH below 3.5. In addition, reaction [1c] includes HCl as a reactant, which is a strong acid itself and will also tend to acidify the resultant aqueous solution. Also, because the kinetics of chlorine dioxide formation in the above reactions is highly dependent on chlorite anion concentration, chlorine dioxide generation is generally carried out in the presence of a high concentration (>1000 ppm) of chlorite anion. As a result, the resultant aqueous solution of chlorine dioxide must often be diluted to lower concentrations suitable for specific applications. Therefore, the preparation of chloride dioxide using one of the reactions [1a]-[1c] is not ideal for certain applications such as, for example, disinfecting drinking water or food products.

Chlorine dioxide may also be prepared from chlorate anion by either acidification or a combination of acidification and reduction. Examples of such reactions include:

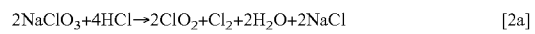  [2a]

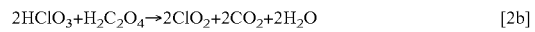  [2b]

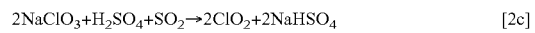  [2c]

At ambient conditions, all of these reactions require strongly acidic conditions, which significantly limits their application in, for example, disinfecting drinking water or food products. Heating the reactants to high temperatures and continuous removal of chlorine dioxide from the product solution can relax the requirement for strong acidity in the solution, but adds significant extra cost to the process and reduces the effectiveness of the product for disinfecting water or food products.

WO 2007/079287 describes a solution that contains sodium chlorite at a substantially neutral or slightly alkaline pH. With addition of an acid, the sodium chlorite in the solution is activated and chlorine dioxide is generated in situ in the solution. However, the resultant solution is acidic because of the added acid. WO 2007/079287 teaches that contamination of the chlorine dioxide solution with alkali metal salts can accelerate decomposition of the chlorine dioxide solution, even when the solution contains about 2500 ppm or less of alkali metal salt impurities. Such alkali metal salts include sodium chloride, magnesium chloride, calcium chloride and sodium sulfate.

U.S. Pat. No. 6,479,037 discloses a chlorine dioxide composition for tooth whitening. The composition is prepared by combining a chlorine dioxide precursor component with an acidulant. The chlorine dioxide precursor is a solution of metal chlorite at a pH greater than 7. The acidulant is acidic, preferably having a pH of 3.0 to 4.5. The chlorine dioxide precursor is applied to the tooth surface. The acidulant is then applied over the chlorine dioxide precursor for activating the metal chlorite to produce chlorine dioxide. The pH at the contact interface between the chlorine dioxide precursor and acidulant is preferably less than 6 and, most preferably, in the range of about 3.0 to 4.5. Thus, the produced chlorine dioxide solution on the tooth surface will be acidic.

U.S. Pat. No. 8,673,297 teaches a tablet including particulate $NaClO_2$, particulate $NaHSO_4$, particulate $CaCl_2$ and particulate phosphate. The tablet may also contain a framework forming material which is a low solubility compound such as calcium sulfate, calcium phosphate, aluminum phosphate, magnesium phosphate, ferric sulfate, ferric phosphate and zinc phosphate; or a low solubility amorphous material such as silica-alumina gel, silica-magnesia gel, silica-zirconia gel and silica gel. The tablet may additionally include a clay or other substantially insoluble framework or pore former such as Laponite clay. The particulate ingredients are mixed with the framework forming material and compressed into tablets by a tableting machine. The produced tablets are said to have a high conversion rate of chlorite anion to chlorine dioxide.

US 2005/0155936 teaches a solid composition with a reactive core comprising $NaClO_2$ and $NaHSO_4$ for generating chlorine dioxide. The reactive core is coated with a barrier material. The solid composition also contains a halogen component. Some examples of the halogen component include calcium hypochlorite, trichloroisocyanurate, dichloroisocyanurate, lithium hypochlorite, dibromo-dimethylhydantoin, bromo-chloro-dimethylhydantoin, sodium bromide, sodium chloride, and any combination thereof. The reactive core can generate chloride dioxide when it is contacted with water. These solid compositions are disclosed for use to disinfect large bodies of water such as pools and spas, or to bleach materials.

The prior compositions also suffer from another important deficiency, which is their failure to provide prolonged disinfection. In most cases, the generated chlorine dioxide gas is not retained in the aqueous solution for a significant period of time. In contrast, the present invention provides a tablet composition that produces chlorine dioxide microbubbles in aqueous media in a manner whereby the chlorine dioxide can be retained in the aqueous media for a significant period of time in order to provide a prolonged disinfecting effect.

SUMMARY OF THE INVENTION

In one aspect, the present invention provides a composition comprising at least one metal chlorite, an effervescent agent, and an acid source.

In one aspect, the present invention provides a composition including a core encapsulated by a coating, wherein the core comprises at least one metal chlorite dispersed in a composite matrix and an effervescent agent, and the coating comprises an acid source.

In another aspect, the metal chlorite is selected from alkali metal chlorites, alkaline earth metal chlorites, and combinations thereof.

In yet another aspect, the composite matrix includes at least one binder selected from polysulfones, polyamides, polyvinyl pyrrolidones, polycarbonates, polyacrylonitriles, sodium alginate, and combinations thereof.

In yet another aspect, the effervescent agent is selected from anhydrous perborates, water-soluble bicarbonates, percarbonates, and combinations thereof.

In yet another aspect, the core also includes one or more desiccants.

In yet another aspect, the acid source is selected from inorganic acid salts, salts comprising an anion of a strong acid and a cation of a weak base, water soluble solid acids, and combinations thereof.

In yet another aspect, the coating also includes a stabilizer to stabilize the acid source.

In yet another aspect, the coating also includes a low solubility amorphous material selected from silica-alumina gel, silica-magnesia gel, silica-zirconia gel, silica gel, and combinations thereof.

In yet another aspect, the coating further includes a demolding agent.

In yet another aspect, the composition is in the form of a tablet.

DETAILED DESCRIPTION OF THE PREFERRED EMBODIMENT(S)

Figure 1:
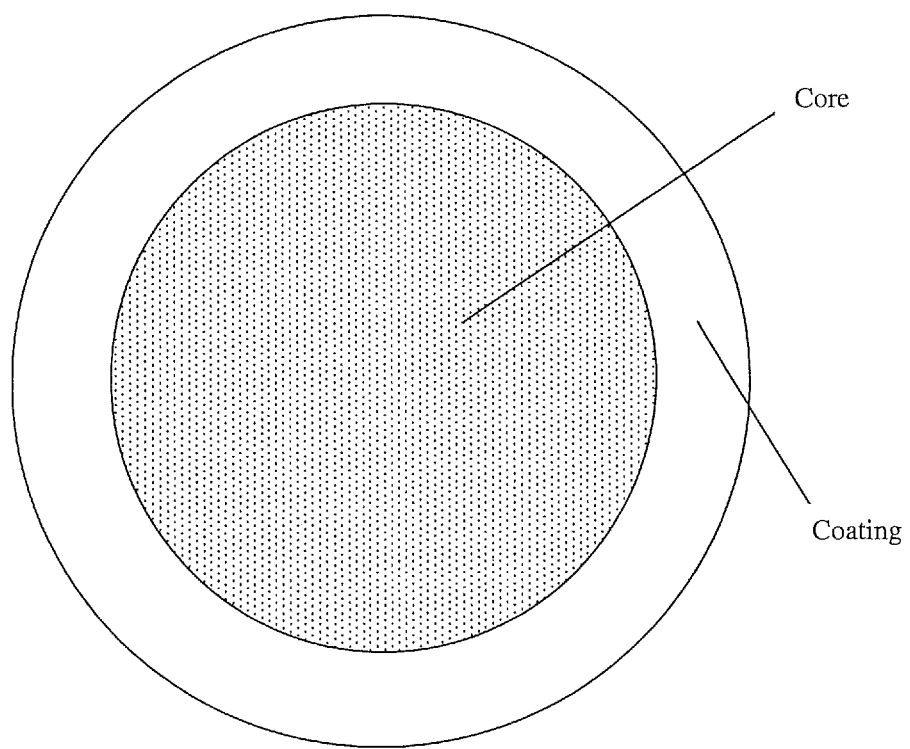
FIG. 1 is schematic diagram showing a tablet according to one embodiment of the present invention. The tablet comprises a core that is encapsulated by a coating.

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in, other systems and methods. Before explaining the disclosed embodiments of the present invention in detail, it is to be understood that the invention is not limited in its application to the details of any particular embodiment shown. Additionally, the terminology used herein is for the purpose of description and not for limitation. Furthermore, although certain methods are described with reference to steps that are presented herein in a certain order, in many instances, these steps can be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more", and "at least one" can be used interchangeably herein. The terms "comprising", "including", "having" and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent, or parameter disclosed herein is to be interpreted as being disclosed for use alone or in combination with one or more of each and every other component, compound, substituent, or parameter disclosed herein.

It is also to be understood that each amount/value or range of amounts/values for each component, compound, substituent, or parameter disclosed herein is to be interpreted as also being disclosed in combination with each amount/value or range of amounts/values disclosed for any other component(s), compounds(s), substituent(s), or parameter(s) disclosed herein and that any combination of amounts/values or ranges of amounts/values for two or more component(s), compounds(s), substituent(s), or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent, or parameter disclosed in the description or an example is to be interpreted as a disclosure of either a lower or an upper limit of a range and thus can be combined with any other lower or upper limit of a range or specific amount/value for the same component, compound, substituent, or parameter disclosed elsewhere in the application to form a range for that component, compound, substituent, or parameter.

In one aspect, the present invention provides a composition with a core encapsulated by a coating as shown, for example, in FIG. 1. The core of the composition includes at least one metal chlorite dispersed in a composite matrix and an effervescent agent. The coating includes at least one acid source that can act as a proton source when the coating is contacted with water.

The mechanism for the production of chlorine dioxide by the composition of the present invention may involve the reaction:

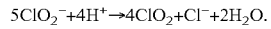
$$5ClO_2^- + 4H^+ \rightarrow 4ClO_2 + Cl^- + 2H_2O.$$

In the case, for example, where the metal chlorite is $NaClO_2$ and the acid source is $NaHSO_4$, one reaction scheme for the conversion may be represented as follows:

$$5NaClO_2 + 4NaHSO_4 \rightarrow 4ClO_2 + 4Na_2SO_4 + NaCl + 2H_2O$$

The at least one metal chlorite in the core can generally be any metal chlorite. Preferred metal chlorites are alkali metal chlorites, such as sodium chlorite and potassium chlorite. Alkaline earth metal chlorites can also be employed. Examples of alkaline earth metal chlorites include barium chlorite, calcium chlorite, and magnesium chlorite. The most preferred metal chlorite is sodium chlorite ($NaClO_2$).

In some embodiments, the amount of metal chlorite in the core may be from about 10 wt % to about 90 wt %, or about 15 wt % to about 90 wt %, or about 15 wt % to about 85 wt %, or about 20 wt % to about 90 wt %, or about 20 wt % to about 85 wt %, or about 20 wt % to about 80 wt %, or about 25 wt % to about 90 wt %, or about 25 wt % to about 85 wt %, or about 25 wt % to about 80 wt %, or about 25 wt % to about 75 wt %, or about 30 wt % to about 90 wt %, or about 30 wt % to about 85 wt %, or about 30 wt % to about 80 wt %, or about 30 wt % to about 75 wt %, or about 30 wt % to about 60 wt %, or about 35 wt % to about 60 wt %, based on the total weight of the core.

The composite matrix of the core comprises at least one binder or matrix-forming agent. The binder may be selected from polysulfones, polyamides, polyvinyl pyrrolidones, polycarbonates, polyacrylonitriles, and sodium alginate any combination thereof. The polysulfone may be a polyethersulfone. In some embodiments, the binder may include one or more of polyamide (PA), polyvinyl pyrrolidone (PVP), polyamide:polyvinyl pyrrolidone (PA:PVP), polyethersulfone (PES), and polyethersulfone:polyvinyl pyrrolidone (PES:PVP).

"Polysulfones," as used herein, refers to a family of thermoplastic polymers which contain the subunit -aryl-$SO_2$-aryl-O—. Some examples of polysulfones include a polymer of 4-[2-(4-hydroxyphenyl)propan2-yl]phenol and 4-(4-hydroxyphenyl)sulfonylphenol (commonly known as polysulfone), and a polymer of benzene-1,4-diol and 4-(4-hydroxyphenyl)sulfonylphenol (commonly known as polyethersulfone, polyarylethersulfone or polyphenylsulfone). Another suitable polysulfone is a copolymer of 4-(4-hydroxyphenyl)phenol and 4-(4-hydroxyphenyl)sulfonylphenol, also known as polyphenylsulfone.

In some embodiments, the binder may comprise a blend of homopolymers, such as a blend of a polyamide and/or polyethersulfone, polyvinylpyrrolidone and sodium alginate. In one specific embodiment, the binder comprises polyamide and/or polyethersulfone at about 5 to about 100% by weight of the binder, such as at least about 40% or 50% by weight of the binder, and in one embodiment, up to about 95%, or up to about 90%, or up to about 85%, or up to about 80%, or up to about 75%, by weight of the binder. Polyvinylpyrrolidone or sodium alginate may supply the balance of the binder.

In an exemplary embodiment, the binder is a blend comprising a mixture of polyvinylpyrrolidone and one or both of polyamide and polyethersulfone. This blend may be substantially free of other polymers. By "substantially free" is meant less than about 10 wt % of other polymers and in one embodiment, less than about 5 wt % of other polymers. The polyethersulfone and/or polyamide may constitute from about 5 to about 95% by weight of the blend, e.g., at least about 40% by weight, or at least about 45% by weight, or at least about 50% by weight, or at least about 55% by weight, or at least about 60% by weight, or at least about 65% by weight, or at least about 70% by weight, or at least about 75% by weight of the blend.

In one embodiment, the binder comprises polyvinyl pyrrolidone (PVP), with optional polymers such as a polyamide, polyvinyl acetate or polyethersulfone. Polyvinyl pyrrolidone, also known as povidone or povidonum, is a homopolymer of N-vinyl pyrrolidone, typically having a weight average molecular weight (Mw) of about $1 \times 10^3$ to about $1 \times 10^7$, about $2.5 \times 10^3$ to about $3 \times 10^6$, or about $1 \times 10^4$ to about $1 \times 10^5$. Polyvinylpyrrolidone is available from BASF under the trade name KOLLIDON® and from ISP under the trade name PLASDONE®.

The binder may comprise from about 1 wt % to about 20 wt %, or from about 2 wt % to about 18 wt %, or from about 4 wt % to about 16 wt %, or from about 5 wt % to about 15 wt %, or from about 6 wt % to about 14 wt %, or from about 7 wt % to about 13 wt %, or from about 8 wt % to about 12 wt %, or from about 9 wt % to about 11 wt %, or from about 9 wt % to about 10 wt %, of the total weight of the core.

The effervescent agent of the core is a solid compound that can cause the composition to effervesce upon contact with water by producing gas bubbles, foaming or by liberation of a gas. The effervescent agent may be selected from anhydrous perborates, water-soluble bicarbonates and percarbonates.

The term "perborate" as used herein includes any water-soluble perborate salt, such as sodium perborate, calcium perborate, ammonium perborate, magnesium perborate, and potassium perborate. The perborates react with water to release hydrogen peroxide. The water-soluble bicarbonates include alkali metal bicarbonates, e.g. sodium or potassium bicarbonate. The bicarbonates react with water to release carbon dioxide. In some embodiments, the effervescent agent is selected from percarbonates such as alkali metal percarbonates.

In one embodiment, the effervescent agent is sodium percarbonate, which generates a large quantity of $CO_2$ that causes the composition to effervesce.

The amount of effervescent agent in the core may be from about 1 wt % to about 15 wt %, or from about 2 wt % to about 13 wt %, or from about 3 wt % to about 11 wt %, or from about 3 wt % to about 10 wt %, or from about 4 wt % to about 9 wt %, or from about 4 wt % to about 8 wt %, or from about 5 wt % to about 7 wt %, of the total weight of the core.

In some embodiments, the core may additionally comprise one or more desiccants for absorbing moisture in the composition in order to maintain a low water content in the composition. This may be important as excessive moisture in the composition may trigger premature release of chlorine dioxide. The desiccant may be selected from calcium oxide, magnesium sulfate, sodium phosphate di-basic, ammonium chloride, potassium carbonate, potassium aluminum disulfate, magnesium chloride, diammonium sulfate, sodium nitrate, calcium chloride, calcium sulfate, sodium chloride, potassium bromide, clays and any combination of these materials.

The amount of desiccant may be from about 5 wt % to about 25 wt %, or from about 6 wt % to about 24 wt %, or from about 8 wt % to about 23 wt %, or from about 10 wt % to about 22 wt %, or from about 12 wt % to about 21 wt %, or from about 14 wt % to about 20 wt %, or from about 16 wt % to about 20 wt %, or from about 17 wt % to about 20 wt %, of the total weight of the core.

Referring to FIG. 1, the coating of the tablet composition includes at least one acid source. As used herein, the term "acid source" generally means a solid compound which is itself acidic or produces an acidic environment when in contact with water by liberating protons. The acid source may be water soluble or substantially insoluble in water. Preferred acid sources are those which produce a pH of below about 4, more preferably below about 3, and most preferably below about 1.

The acid source may include inorganic acid salts and salts comprising an anion of a strong acid (with pKa<3) and a cation of a weak base (with pKa between 7 and 11), such as aluminum chloride, aluminum nitrate, cerium nitrate, calcium chloride, magnesium chloride, magnesium nitrate, lithium chloride, magnesium sulfate, aluminum sulfate, sodium sulfate and iron sulfate. In some embodiments, the acid source may be a water soluble solid acid such as boric acid, citric acid, tartaric acid, or a water soluble organic acid anhydride such as maleic anhydride and acetic anhydride.

In some embodiments, the acid source is selected from water soluble inorganic acid salts such as, sodium acid sulfate ($NaHSO_4$), sodium dihydrogen phosphate ($NaH_2PO_4$), potassium acid sulfate ($KHSO_4$), potassium dihydrogen phosphate ($KH_2PO_4$), and combinations thereof. The preferred acid source is sodium acid sulfate (sodium bisulfate).

The amount of acid source in the coating may be from about 50 wt % to about 100 wt %, or from about 55 wt % to about 95 wt %, or from about 60 wt % to about 95 wt %, or from about 65 wt % to about 95 wt %, or from about 70 wt % to about 95 wt %, or from about 70 wt % to about 90 wt %, or from about 75 wt % to about 90 wt %, or from about 80 wt % to about 90 wt %, of the total weight of the coating.

In some embodiments, the coating of the composition further comprises an acid stabilizer. This acid stabilizer can stabilize the acid source in the coating by preventing or inhibiting the acid source from releasing protons before the composition comes into contact with water. The selection of an acid stabilizer is highly specific to the acid source and is within the knowledge of a skilled person. Generally speaking, the acid stabilizer is a salt formed by the acid source after releasing its proton. For example, sodium sulfate can function as stabilizer for sodium bisulfate.

In some embodiments, the coating of the composition further comprises a low solubility amorphous material such as silica-alumina gel, silica-magnesia gel, silica-zirconia gel, or silica gel. The silica alumina gel may be formed by a reaction between sodium silicate and aluminum sulfate. Silica-magnesia gel may be formed by a reaction between sodium silicate and magnesium sulfate. Silica-zirconia gel may be formed by a reaction between sodium silicate and zirconyl sulfate. Silica gel may be formed by a reaction between sodium silicate and protons from an acid source. In some embodiments, the coating of the composition also comprises a demolding agent to make it easier for the composition to be released from a transfer mold of, for example, a tableting machine. One example of the demolding agent is sodium chloride.

In another aspect, the present invention provides a composition comprising at least one metal chlorite, an effervescent agent, and at least one acid source. The composition may be in a powder form. The composition may further comprise a binder, a desiccant and/or an acid stabilizer. Each of these components has been described herein. In one embodiment, the composition comprises $NaClO_2$, $2Na_2CO_3 \cdot 3H_2O_2$, $MgSO_4$, sodium alginate, $NaHSO_4$, $Na_2SO_4$, NaCl and silica gel. In another embodiment, the composition comprises $NaClO_2$, $2Na_2CO_3 \cdot 3H_2O_2$, $MgSO_4$, PVP, $NaHSO_4$, $Na_2SO_4$, NaCl and silica gel.

It is believed that, upon contact with water, the metal chlorite will react with acid formed by the acid source in the presence of water to produce gaseous chlorine dioxide. In addition, the effervescent agent will react with water to produce gas bubbles that cause the aqueous mixture to effervesce. The effervescence leads to production of microbubbles of chlorine dioxide that are released into the water and are entrained or dissolved therein.

The composition of the present invention exhibits a high conversion ratio from chlorite anion to chlorine dioxide in an aqueous environment. For example, the conversion ratio is typically no less than about 0.25, or no less than about 0.30, or no less than about 0.35, or no less than about 0.40, or no less than about 0.45, or no less than about 0.50, or no less than about 0.60, or no less than about 0.70, or no less than about 0.75, or no less than about 0.80. The term "conversion ratio" used herein means the calculated ratio of the chlorine dioxide concentration in the aqueous mixture to the sum of free chlorine dioxide plus chlorite ion concentration in the aqueous mixture.

The composition of the present invention is capable of completing the conversion to chlorine dioxide in less than about 1 hour, preferably in less than about 0.8 hour, preferably in less than about 0.7 hour, preferably in less than about 0.6 hour, preferably in less than about 0.5 hour, preferably in less than about 0.4 hour, preferably in less than about 0.3 hour, preferably in less than about 0.2 hour, preferably in less than about 0.1 hour, preferably in less than about 0.05 hour.

In one embodiment, the core of the composition comprises $NaClO_2$, $2Na_2CO_3 \cdot 3H_2O_2$, $MgSO_4$ and PVP, while the coating comprises $NaHSO_4$, $Na_2SO_4$, NaCl and silica gel. In another embodiment, the core of the composition comprises $NaClO_2$, $2Na_2CO_3 \cdot 3H_2O_2$, $MgSO_4$ and sodium alginate, while the coating comprises $NaHSO_4$, $Na_2SO_4$, NaCl and silica gel. This composition can generate chlorine dioxide at a rate of about 2 grams of chlorine dioxide gas per 20 grams of composition in about 3 minutes.

Another advantage of the present invention is that the generated chlorine dioxide microbubbles are sufficiently small to remain entrained in the aqueous media for an extended time period. This provides the ability to deliver a prolonged disinfecting effect using the composition. In some embodiments, the generated chlorine dioxide microbubbles remain entrained in the aqueous media for at least about 3 days, or at least about 4 days, or at least about 5 days, or at least about 6 days, or at least about 7 days, or at least about 8 days, or at least about 10 days, or at least about 12 days, or at least about 14 days, or at least about 16 days, or at least about 18 days, or at least about 20 days, or at least about 25 days, or at least about 30 days.

In another aspect, the present invention provides a method of producing the composition used to generate chlorine dioxide. The composition is preferably produced in a low humidity environment, such as an environment with a relative humidity lower than about 20%, or lower than 18%, or lower than about 16%, or lower than 15%, or lower than about 13%, or lower than 12%, or lower than about 10%. Before making the composition, precautions are taken to ensure that all of the components that are to be used have a low water content.

The components for the core are first thoroughly mixed to produce a composite matrix. The components for the core comprise at least one metal chlorite, a binder and an effervescent agent.

The coating material is prepared by mixing the acid source and the optional acid stabilizer and demolding agent. The coating composition may be temporarily stored under dry (less than 30% relative humidity), cool (at 15° C. or less) and dark (no sun light or lamp bulb light) conditions.

A rotary pelleting machine may be used to produce tablets from the composition of the present invention. The tablets may be produced in various dosages and can be stored in tightly sealed packages. For example, three sizes of tablets may be produced: 20 grams (0.71 oz.) tablets, 1 gram (0.035 oz.) tablets and 0.2 gram (0.0071 oz.) tablets. The tablets can be used for disinfecting water (drinking water, pool water, spa water, waste water, etc.) or contaminated surfaces. The tablets may also be mixed with water to provide a disinfecting liquid containing chlorine dioxide. The tablets may also be used as a deodorant.

In another aspect, the present invention provides an alternative powder composition comprising at least one metal chlorite, an effervescent agent and an acid source. In one embodiment, the powder composition comprises three separate packages: one package containing powders of the at least one metal chlorite and the effervescent agent; another package containing powders of a binder (or matrix forming agent); and a third package containing the acid source. The acid source may be a liquid organic acid. All these components may be the same components as discussed above. The contents of the three packages may be mixed right before being used to generate chlorine dioxide.

Tablets or the powder composition may be added to a large body of water, such as a pool or spa, to produce chlorine dioxide in the water to thereby disinfect the water. An aqueous media with one or more tablets added therein may also be prepared for disinfecting surfaces of various structures or equipment. For example, one 20 gram tablet in 50 gallons of water makes an aqueous solution with a concentration of 5 ppm chlorine dioxide. Eleven 20 gram tablets in 5000 gallons of water make an aqueous solution with a concentration of 1 ppm chlorine dioxide. One 1 gram tablet in 23 gallons of water also makes an aqueous solution with a concentration of about 1 ppm chlorine dioxide. The concentration in ppm is expressed as the weight of the tablet in the total weight of the aqueous solution. Such aqueous solutions may be applied to any surface of a structure or equipment to disinfect the surface.

The aqueous solution may be generated as set forth in Tables 1-2 below, where the water is measured in gallons.

TABLE 1

Aqueous solutions producing 500 ppm
[1 gram (0.035 oz.), 6 gram (0.21 oz) or 20 gram (0.71 oz) tablets per specified amount of tap water)

| Amount of Water | To Achieve Use Concentration of (PPM): | Number of 1 gram Tablets | Number of 6 gram Tablets | Number of 20 gram Tablets |
|---|---|---|---|---|
| 1 Quart | 500 | 6 | 1 | |
| 1 Gallon | | 22 | 4 | |
| 5 Gallons | | | 18 | 6 |
| 10 Gallons | | | 36 | 11 |

TABLE 2

Aqueous solutions producing specified ppm
[1 gram (0.035 oz.), 6 gram (0.21 oz) or 20 gram (0.71 oz) tablets per specified amount of tap water)

| Amount of Water | To Achieve Use Concentration of (PPM): | Number of 1 gram Tablets | Number of 6 gram Tablets | Number of 20 gram Tablets |
|---|---|---|---|---|
| 5000 Gallons | 1 ppm | | | 11 |
| 50 Gallons | 5 ppm | 11 | 2 | 1 |
| 10 Gallons | 20 ppm | 9 | 2 | |
| 100 Gallons | 100 ppm | | 72 | 22 |
| 10 Gallons | 250 ppm | | 18 | 6 |
| 50 Gallons | 300 ppm | | 108 | 33 |
| 10 Gallons | 500 ppm | | 36 | 11 |
| 10 Gallons | 1000 ppm | | 72 | 22 |

The aqueous solutions are prepared by filling a suitable container with the specified amount of water (see Tables 1-2). Then, the tablets are added to the water in the container. The container is closed tightly without stirring, shaking or mixing the solution. The tablets, after contacting the water, generate $ClO_2$ microbubbles in the water. After 1 minute, the aqueous solution including the $ClO_2$ microbubbles is ready to use.

The aqueous solution with tablets added carries $ClO_2$ microbubbles. $ClO_2$ is a known disinfectant and deodorant. The aqueous solution can be used to disinfect bacteria, fungi and algae. For example, the aqueous solution may be used to eliminate *Escherichia coli, Salmonella Chloreaesuis* and *Staphylococcus aureus*.

The contact time with the aqueous solution for disinfection of common contaminated locations/objects may be from 1 minute to 5 minutes. When the package of tablets is opened, the tablets should be used immediately or stored in an airtight container. There is no need to clean or rinse solution after disinfection/treatment applications.

References to the aqueous solution in this application refer to a solution in water of a composition in accordance with the present invention. Aqueous solutions may include, for example, solutions wherein some of the components of the composition are not dissolved in the water. For example, an aqueous solution of a composition of the present invention may have chlorine dioxide microbubbles or bubbles entrained in the liquid which are not dissolved in the water, whereas other components of the composition are dissolved in the water.

The aqueous solution with the tablets dissolved therein containing the chlorine dioxide may be used for at least the following applications. The concentrations (ppm) given in this section of the application refer to the total parts of chlorine dioxide in the total amount of aqueous solution.

For Hospital and Health Care Facility Disinfection

The tablets of the invention provide a one-step germicidal cleaner and deodorant designed for cleaning, disinfecting, and deodorizing hard, non-porous environmental surfaces. The tablets of the invention clean quickly by removing dirt, grime, body, oils, dead skin, blood and other organic matter commonly found in hospitals and care facilities. It eliminates odors, leaving surfaces smelling clean and fresh. Product cleans, disinfects and deodorizes surfaces in one step. Its non-abrasive formula is designed for use on hard, non-porous environmental surfaces and any washable surface. Prepare according to use directions for Medical and Broad Spectrum Disinfection at 500 ppm for 5 minutes' contact time or keep surfaces wet for at least 5 minutes.

Health-Care and Veterinary Facilities

Use to disinfect surfaces and instruments in hospitals, medical and dental offices, veterinary offices, veterinary clinics, veterinary hospitals and related facilities. Apply solution to hard, non-porous surfaces and/or instruments thoroughly wetting surfaces with a cloth, mop, sponge or sprayer or by immersion. Allow to air dry. For sprayer applications, use a coarse spray device. Spray 6-8 inches from the surface and spray until totally wet. Do not breathe spray. Allow to air dry. Prepare according to use directions for Medical and Broad Spectrum Disinfection at 500 ppm for 5-minute contact time.

Disinfectant for Hard, Non-Porous, Non-Food Surfaces

The product of the invention may be used to disinfect hard surfaces in hotels, offices, ships, hospitals, schools, factories, nurseries, sick rooms, laundry rooms, eating establishments, medical, veterinary clinics or any other location that may be contaminated. The product may be used to disinfect non-food contact surfaces against *Staphylococcus aureus*. Solution may be applied to surfaces, to include but not be limited to walls, furniture, floors, and equipment. Prepare solution using tablets of the invention according to use directions at 500 ppm for 5-minute contact time.

Disinfection of Bench Tops, Biological Hoods, Incubators, Stainless Steel Equipment and Instruments The product of the invention may be used to disinfect bench tops, biological hoods, incubators, stainless steel equipment and instruments. Remove gross filth prior to disinfection. Prepare solution from tablets of the invention according to use directions at 500 ppm and squirt onto surfaces with squeeze bottle. Surfaces should remain wet for 5-minute contact time.

Odor

The tablets of the invention may be used to eliminate and destroy odors and odor-causing bacteria in hospitals, restaurants, and hotel rooms. Prepare a solution using the tablets of the invention according to use directions at 500 ppm and apply to area with sprayer until covered with mist and let stand for 5-minute contact time.

Deodorize Animal Holding Rooms, Sick Rooms, Morgues, and Work Rooms

Prior to treatment, rooms to deodorize should be in a clean condition. Prepare solution from tablets of the invention according to use directions to 500 ppm. To apply, spray solution using a suitable spraying device onto walls, ceilings, and floor, lightly dampening all surfaces. Allow to air dry, then ventilate area. Reapply as required.

Fungicide

The product of the invention is effective as a fungicide to kill fungi on hard, non-porous surfaces. Prepare a solution from the tablets of the invention and apply according to use directions to 500 ppm, let stand for 1-minute contact time.

Terminal Disinfection Rinse for Stainless Steel Tanks, Transfer Lines, On-Line Equipment, Recirculating and Clean-in Place (CIP) Systems, Food Contact Surfaces and Similar Surfaces, Such as Tables, Trays, Bins Etc, Utensils and Food-Processing Equipment in Poultry, Meat, Fish and Meat Processing Plants, Dairies, Bottling Planets, Restaurants, Canneries and Breweries Prior to disinfection, remove all gross food particles and soil by use of a pre-flush, pre-scrape or pre-soak treatment. Then clean all lines, tanks or surfaces with a suitable detergent followed by a potable water rinse. Prepare the solution using the tablets of the invention. Fill, immerse, circulate, wipe or spray the surface area and ensure that it is thoroughly wet. Hard to reach in-place equipment, pipes, closed vessels, etc. must be filled with the solution to ensure contact of all surfaces. Allow the solution to drain from all treated surfaces and air dry. Do not rinse treated surface.

Farm Equipment and Animal Housing Buildings

The product of the present invention may clean by removing dirt, grime, and other common soils found in animal housing facilities, livestock, and swine or poultry facilities, grooming facilities, farms, kennels, pet stores, veterinary clinics, laboratories or other small animal facilities. It also eliminates odors leaving surfaces smelling clean and fresh. This product cleans, disinfects and deodorizes hard, non-porous environmental surfaces in one step. Its non-abrasive formula is designed for use on hard, non-porous surfaces found in animal housing facilities. For disinfection of hard, non-porous surfaces, follow the disinfection procedure for stainless, galvanized and painted steel, copper, aluminum, finished wood, vinyl, plastics, glazed tiles, sealed brick walls, sandwich panels and feeding/drinking equipment:

Remove all animals and feed from areas being treated.

A. Remove all litter and manure from floors, walls and surfaces of barns, pens, stalls, chutes, and other facilities and fixtures occupied or traversed by animals.

B Empty all troughs, racks, and other feeding and watering appliances.

C Pre-clean visibly soiled surfaces.

D Saturate all surfaces with disinfecting solution by using spray, mop, or sponge. Surfaces must remain wet for 5 minutes.

E Ventilate buildings and other closed spaces. Do not house animals or employ equipment until
treatment has been absorbed or dried.

F Immerse clean forks, shovels, and scrapers used for removing litter and manure in the disinfecting solution for 5 minutes. Allow to air dry.

G Avoid direct food contact

H Prepare a solution from the tablets of the invention according to use directions at 1000 ppm for 5-minute contact time.

Control Odor and Slime Forming Bacteria in Animal Confinement Facility

To treat animal confinement facilities, remove all litter and manure from premises and thoroughly clean all surfaces with cleaner. Rinse with clean water. Prepare a solution from the tablets of the invention according to use directions at 500 ppm. Use commercial sprayer to saturate all surfaces.

Foam Solution

The tablets of the invention can be used to prepare solutions that eliminate odors on surfaces in dark damp areas. Prepare according to use directions at 500 ppm for 10 minutes' contact time.

Cleaning and Disinfection of Poultry Drinking Water

Stage 1: Depending on the age and maintenance history of the pipe network, this stage requires from 1 to several weeks to fully break down the debris layer in the pipe infrastructure. Start with Stage 1 solution applied dosing point. Minimal product will be detected at the drinking-end of the system during this phase as the product is used to wash off and oxidize debris on the surface. Older systems may require a longer period of exposure to remove build-up. Stage 2: After Stage 1, prepare Stage 2 solution and use directly in system with automatic on-demand injection system. Application specifics may vary by metering system, frequency of replenishment, and overall capacity of drinking container. Prepare solution from tablets of the invention according to use directions at 20 ppm for Stage 1 and to 5 ppm for Stage 2.

To Prevent Airborne and Surface Contamination of the Hatchery from the Tray Washing Room and Loading Platform Close all doors in the tray washing room to avoid contamination of other hatchery operations. Discard all chick downs, egg shells, and cast-off chicks into the trash barrels and transfer the covered containers to the loading platform for disposal. Wash the trays, carriages and other working equipment in a tray washing machine with 300-500 psi water to remove gross filth and soil. As a final rinse in the tray washing machine, use a solution containing 20 ppm of available chlorine dioxide in high pressure water. All the trays, carriers and other working equipment are then allowed to air dry. Hold the disinfected equipment in a closed area for reuse. Entrance and exit from the tray washing room must be through a foot rinse containing a solution of 1,000 ppm of available chlorine dioxide for 15 minutes and allowed to air dry. This treatment is repeated after each use of the tray washing room. The loading platform is washed from time to time to remove gross filth and soil. The trash containers are washed after discarding the contents to remove gross filth and soil. They are then sprayed with a 1,000 ppm solution of available chlorine dioxide.

To Control Bacteria and Odor in the Hatching Area

As soon as chicks are separated from the hatching area, remove all trash containers with eggshells, down, etc. from the hatching area. Remove all poultry and feeds from premises, trucks, coops, and crates. Remove all litter and droppings from floors, walls and surfaces of facilities occupied or traversed by poultry. Empty all troughs, racks and other feeding and watering appliances. Thoroughly clean all surfaces with soap or detergent and rinse with water. Spray or fog the entire area for 5 minutes with 1,000 ppm solution of chlorine dioxide, using a Tri-Jet Fogmaster or equivalent. Allow a ten-minute contact time. Ventilate buildings, coops and other closed spaces. Do not house poultry or employ equipment until treatment has been absorbed, set or dried. Thoroughly scrub treated feed racks, troughs, automatic feeders, fountains and waterers with soap or detergent and rinse with potable water before reuse. All workers in this area should use a hand dip or rinse containing 50 ppm of chlorine dioxide.

To Control Bacteria and Odor in the Incubator Room

The area is sprayed or fogged at least once per week for 5 minutes with a 1,000 ppm solution of available chlorine dioxide, after removing gross filth or soil with a high pressure water wash. Wet all surfaces and allow to dry. The floor must be mopped daily with a solution containing 390 ppm of chlorine dioxide. A shoe and boot bath containing 1,000 pm of chlorine dioxide must be placed at all entrances to the incubator room. 20 ppm of available chlorine dioxide is added to water in the humidification system or the air filters are sprayed with a 100 ppm solution of available chlorine dioxide to reduce airborne bacterial contamination. Each time the eggs are removed from the incubator, a prior glove dip at 50 ppm solution of chlorine dioxide is recommended, followed by a spray of 1,000 ppm solution of chlorine dioxide on the eggs from a spray bottle. Where containers are used to discard bad eggs, 3,125 ppm of chlorine dioxide will control obnoxious odors and bacterial contamination. The doors to the area must be kept closed as much as possible to avoid airborne contamination.

To Control Odor and Bacteria when Separating Chicks in the Chick Room, Chick Grading Box and Sexing Room Remove all poultry and feeds from premises, trucks, coops and crates. Remove all litter and droppings from floors, walls and surfaces of facilities occupied or traversed by poultry. Empty all troughs, racks and other feeding and watering appliances. Thoroughly clean all surfaces with soap or detergent and rinse with water. Spray or fog the entire area for 5 minutes with a 500 ppm solution of available chlorine dioxide. Allow a ten-minute contact time. Ventilate buildings, coops and other closed spaces. Do not house poultry or employ equipment until treatment has been absorbed, set or dried. Thoroughly scrub treated feed racks, troughs, automatic feeders, fountains and waterers with soap or detergent, and rinse with potable water before reuse. All workers in this area must use a hand dip or rinse containing 50 ppm of chlorine dioxide. After use, wash area with high-pressure water to remove gross filth and soil. Use a spray bottle containing a solution of 500 ppm of chlorine dioxide on hands, wire mesh and in empty chick boxes to control contamination and odors from litter. To clean the floor by mopping daily, use a solution containing 500 ppm of chlorine dioxide. Allow to air dry.

To Control Bacteria and Odor in the Egg Room

Wash down the entire egg room with high pressure water containing 20 ppm of available chlorine dioxide to remove gross filth or heavy soil. Spray the entire area for 5 minutes with a sprayer using 500 ppm solution of chlorine dioxide, being sure to cover walls, ceiling, floors, work tables and benches. Allow to dry for 1 hour or if possible overnight before resuming operations. The washing and fogging operations must be conducted once a week or more frequently in cases of heavy contamination during operations. If it is necessary to clean the floors by mopping, then use a 500 ppm solution of chlorine dioxide. Allow to dry on the floor. A shoe or boot bath of 500 ppm of chlorine dioxide is placed at the entrance to the egg room. Doors to the room must be kept closed at all times. A glove dip, rinse tank or basin containing 50 ppm of chlorine dioxide is used on entering and exiting the room. Both the shoe and boot bath and glove dip must be replaced daily, or sooner if traffic is heavy. Humidification water is treated with 40 ppm of available chlorine dioxide to prevent the build-up and airborne spread of odor-causing microorganisms. Provide 20 ppm of chlorine dioxide to the water supply in the egg washing machine.

Egg Handling for Non-Food Purposes

For use on eggs for non-food purposes, temperature should not exceed 130° F. Use product with sprayer to completely wet eggs. Allow to dry. Prepare a solution from the tablets of the invention according to use directions at 5 ppm.

For Use in Incubator Humidification Systems

Prepare solution using the tablets of the invention and inject into humidification water supply. Prepare the solution according to use directions at 300 ppm.

Farm Water Treatment

Use the tablets of the invention for making a solution for continuous in-line water dosing, using a dosing pump to deliver product Prepare a solution using the tablets of the invention according to use directions at 5 ppm Transportation, Loading and Hauling Equipment Shipping containers, railroad cars, railroad tanks, cars, trucks, truck trailers, loading chutes, reusable crates and other equipment for transportation of animals, produce and vegetables, should be cleaned and disinfected prior to use. Do not mix product with acid cleaners. Pressure spray or scrub with solution, treating all exposed areas. Prepare a solution from the tablets of the invention according to use directions at 500 ppm for 5-minute contact time.

Agricultural Irrigation Systems, Fungicide and Cut Flowers

Product may be used to treat, control rusts and leaf spots, extend shelf-life of cut flowers; and as a fungicide, to remove slimes and inhibit re-emergence in irrigation and other non-potable water systems. Prepare a solution from the tablets of the invention according to use directions at 300 ppm.

Pots and Flats

Apply a solution made from the tablets of the invention to used planting devices such as pots and flats. Remove all loose soil and plant residue prior to application. Soak pots and flats in 500 ppm solution for 10-minute contact time.

Cutting Tools

Soak cutting tools in a solution of 500 ppm made from the tablets of the invention and allow tools to remain wet for best results. At the end of the work period, dry and oil the tools.

Bulbs

Use the tablets of the invention to prepare a solution to treat spoilage causing bacteria of bulbs. Prepare product solution at 500 ppm, Soak cleaned bulbs for 10 minutes, remove and allow to dry before storage.

Evaporative Coolers

Prepare a solution from the tablets of the invention according to use directions at 250 ppm. Allow to circulate throughout cooling pads and catch basins. Add to evaporative cooler water and repeat as needed every 14 days.

Retention Basins and Ponds

Use a solution made from the tablets of the invention at a concentration of 2-5 ppm. Repeat applications weekly for best results. Do not use when fish are present.

Decorative Pools, Fountains and Water Displays

Prepare a solution from the tablets of the invention according to use directions and add to water to achieve a level of 5-10 ppm. Do not use when fish are present.

Nematode Worm Eradication

To attack the nematode worm, prepare a solution from the tablets of the invention for use in the Nematode Contaminated Water (NCW). Filtration: The NCW treated with the solution should be filtered with gravel filtration or sand filtration to remove the Nematode bodies. This process is important so as to remove the nutrition to potentially support subsequent microorganisms. Prepare a solution using the tablets of the invention according to use directions at 5 ppm for 4 hours contact time.

Potato Facilities

The tablets of the invention can be used to prepare solutions for use in potato facilities. For walls, ceilings, floors, planting and harvesting equipment and truck beds, spray a solution of 100 ppm for 10-minute contact time. To use in potato rinse tanks, flumes and lines, use a chemical feed pump or injector system and apply a solution made using the tablets of the invention according to use directions at 5 ppm.

Cleaning and Disinfection Dairy Equipment

The tablets of the invention can be used to prepare solutions that are effective as a disinfectant and deodorizer of hard surface dairy industry equipment. Normal operating temperatures are +/−75 F. Milk deposits and other debris should be removed by mechanical means prior to disinfection with product solution. Do not mix product with acid cleaners. Rinse with potable water. Prepare a solution from the tablets of the invention according to use directions at 500 ppm for 5-minute contact time.

Disinfection of Waterlines

Solutions prepared from the tablets of the invention may be used to disinfect lines used in fountain drink or other beverage preparation, storage, transfer and dispensing. Rinse disinfected lines with potable water until chlorine dioxide residual has gone below 1.0 mg/L as determined by an appropriate testing method in accordance with 21 CFR § 173.300. Prepare a solution from the tablets of the invention according to use directions at 500 ppm for 5 minutes.

Contact Surface Cleaner and Disinfectant

Use as a terminal rinse for stainless steel, and other non-porous food contact surfaces including tanks, transfer lines, Clean in Place (CIP) systems and other food processing equipment. Remove all gross food particles and soil prior to cleaning by use of pre-flush, pre-scrape or pre-soak treatment. Clean tank, line or surface thoroughly using suitable cleaner and rinse with potable water before use. Prepare a solution using the tablets of the invention according to use directions at 100 ppm. To treat: Fill, flush, immerse or spray tank, line, equipment or food contact surface with the solution. Leave surface wet for at least 1 minute. After cleaning, drain and allow to dry. Do not reuse solution if it becomes soiled, diluted or after 8 hours Fruit and Vegetable Rinse Before treatment, whole, uncut fruits and vegetables should be pre-washed and rinsed with clean potable water. Prepare a solution using the tablets of the invention according to use directions at 5 ppm. Immerse produce in solution for 10-20 seconds and rinse with clean potable water.

Municipal Well Water

To treat municipal well water, prepare a solution using the tablets of the invention according to use directions to achieve a 1 ppm concentration using a metering pump, or injector system. Residual disinfectant and disinfection by-products must be monitored as required by the National Primary Drinking Water Regulations (40 CFR Part 141) and State Drinking Water Standards.

Well Water Treatment

Flush the well casing with a solution made with the tablets of the invention to wash off debris. Back wash the well to increase yield and reduce turbidity. Use a chlorine dioxide test kit to monitor the residual level. Re-treat well if water samples are becoming biologically unacceptable. Residual disinfectant and disinfection by products must be monitored as required by the National Primary Drinking Water Regulations (40 CFR Part 141) and State Drinking Water Standards. Prepare a solution using the tablets of the invention according to use directions at 20 ppm for backwash and 5 ppm thereafter.

Disinfection of Filters and Pipes in Swimming and Wading Pools

To disinfect filters and pipes in swimming pool, prepare a solution using the tablets of the invention. Soak in water with product Prepare the solution using the tablets of the invention according to use directions at 500 ppm for 5 minutes' contact time.

Restrooms/Bathrooms, Refuse Containers, Diaper Pails, Storage Lockers for Deodorizing Remove gross filth prior to treatment. Drain. Prepare a solution from the tablets of the invention according to use directions at 250 ppm and apply with sprayer until covered with mist and let stand for 5-minute contact time. Air dry and repeat as necessary.

Pet Litter Boxes, Carpets, and Concrete Floors for Deodorizing

For litter boxes: wash out the litter box with suitable detergent and rinse with clean potable water. Soak overnight in a solution of 650 ppm made using the tablets of the invention. For use on carpets: Prepare a solution using the tablets of the invention of 500 ppm and add to rug shampoo mix. Allow to air dry. Do not apply until a sample test has been tried and observed for at least 24 hours to avoid carpet or fabric bleaching. For use on concrete floors: Clean floor thoroughly using suitable detergent, rinse with clean water. Prepare a solution from the tablets of the invention of 1,250 ppm and apply. Mop or spray solution liberally onto floor. Allow to air dry. For animal baths: Wash animal well with appropriate pet shampoo, rinse with clean water. Prepare a solution from the tablets of the invention of 100 ppm and rinse animal thoroughly. Allow to air dry. Avoid direct contact with animal's eyes, nose and ears.

Ventilation Systems

To treat non-porous hard surfaces for odor causing bacteria associated with ventilation and air conditioning duct work in residential, commercial, ad institutional situations. Prior to inspecting, cleaning, treating or working on a ventilation system of its components, the system must be turned off or disconnected from any part of the system that is not isolated. Mechanically clean, vacuum, or blow free of dirt, dust, mold and debris all duct work using a commercial duct cleaning system or service prior to treatment. The air ducts to be treated must be mechanically sound and free of air leaks. Application of solution: activated solutions may be sprayed or fogged into duct work. All surfaces must be thoroughly wetted for at least 10 minutes. Spray application is the preferred method on large surfaces that are easily accessed by removing entry plates or access panels. The selected spray equipment must provide a consistent particle size (1-300 microns) and a uniform spray pattern using a 0.011" spray lip. Avoid excess wetting but be certain coverage is complete on the tops, sides and bottoms of the unlined sheet metal air ducts. Fogging application is preferable to areas of the air ducts that are less accessible. Equipment capable of generating 15 to 60 micron particle sizes will generally treat an area 8 feet away from fogging generator. Avoid using thermal type fog generators. All preexisting or treatment created access panels must be properly resealed or replaced in accordance with Industry Standards after servicing. During application, the area must be closed as tightly as possible and sealed. After spraying or fogging, the area must be opened and aired for one (1) hour before re-entry.

Industrial Cooling Tower Water

Solutions made from the tablets of the invention will help control, inhibit or remove slime forming bacteria, in recirculating water systems. The solution may be used as an initial or remedial treatment in cases of significant build-up. Repeat daily until desired results are achieved. Circulate water in normal system operation. Prepare a solution from the tablets of the invention according to use directions at 100 ppm. For once through water cooling systems: Prepare a solution using the tablets of the invention according to use directions and apply using an appropriate method. Slug dose: Prepare a solution using the tablets of the invention at 20 ppm. Continuous dose: Prepare a solution using the tablets of the invention at 1 ppm.

Direction to Flush Water Distribution Systems

Flush water distribution system with a solution prepared from the tablets of the invention to wash off debris. Back wash the water distribution system to increase yield and reduce turbidity. Use the prepared solution as the backwash. Prepare the solution using the tablets of the invention according to use directions at 250 ppm for 10 minutes' contact time.

Car, Train and Truck Wash Water Used at Commercial Car Washes

The tablets of the invention can be used to prepare solutions that are effective against odor causing bacteria in waste water commonly used at commercial car wash operations and at facilities engaged in washing trucks, trains, boats and RV's. Waste water facilitates odors and increased disposal costs. The product will eliminate both aerobic and anaerobic bacteria. Prepare a solution from the tablets of the invention according to use directions at 500 ppm for 5-minute contact time.

Water Based Cutting Fluid/Oils

The tablets of the invention can be used to prepare a solution that will help control bacterial slime, odor causing bacteria and reduce microbiological growth in water-based cutting oils. For batch treatment, prepare a solution using the tablets of the invention according to use directions to achieve 2 ppm $ClO_2$ and add to a fresh system. Repeat weekly or on first indication of increased bacterial slime contamination (odor, slime or bacterial count). For continuous treatment, prepare solution according to use directions to achieve 1 ppm $ClO_2$ and add to the system. For badly contaminated systems, slug-dose system with a solution prepared using the tablets of the invention according to use directions to achieve 20 ppm $ClO_2$. After 12 hours, start with the continuous procedure described above.

Pulp and Paper Mills

The tablets of the invention can be used to prepare solutions that are effective in controlling slime forming bacteria within paper mill process water. Dose varies with the degree of microbiological and process contamination measured. Depending on the specific requirements of the system, apply product continuously or intermittently. Repeat intermittent treatments as required to maintain control. Must stay within all local, state and Federal Regulations for discharge. 1 ppm of aliphatic Amines removed for 5.0 ppm of product above a pH of 7.0. Prepare a solution using the tablets of the invention according to use directions at 5 ppm.

Waste Water Treatment

Solutions prepared using the tablets of the invention are effective as both a disinfectant and an oxidant in wastewater treatment. The required dose varies with water conditions and the degree of contamination present. For most municipal and other wastewater systems, a concentration of 5 ppm is sufficient to provide adequate disinfection. For sulfide odor control, between pH 5-9, a solution with a minimum of 5 ppm of product should be applied to oxidize 1 ppm of sulfide (measured as sulfide ion). For phenol destruction, at pH less than 8, 1 ppm product will oxidize 1 ppm phenol; at pH greater than 10, 5 ppm product will oxidize 1 ppm phenol. Prepare a solution from the tablets of the invention according to use directions at 1-5 ppm.

Disinfection of Storage Tanks and Pipelines

After emptying the tank or pipeline, flush with potable water. Add product concentrate to the flush water and circulate through the system. Use hot water if available, up to 160° F. throughout the entire circulation system. Rinse with potable water. Drain. Allow to air dry. Close tanks to protect against contamination. Do not mix product with acid cleaners. Residual disinfectant and disinfection by products must be monitored as required by the National Primary Drinking Water Regulations (40 CFR Part 141) and State Drinking Water Standards. Prepare a solution from the tablets of the invention according to use directions at 500 ppm for 5-minute contact time.

Cleaning and Disinfection of Hot Tubs/Spas:

The tablets of the invention may be used to prepare a solution to clean and disinfect hot tubs and spas. While the hot tub or spa is empty, apply treatment, then flush system. After system is flushed, rinse with potable water. Residual disinfectant and disinfection byproducts must be monitored as required by the National Primary Drinking Water Regulations (40 CFR Part 141) and State Drinking Water Standards. Prepare according to use directions at 500 ppm for 5-minute contact time.

Iron and Manganese Removal

Use the required concentration depending on the measured pH levels while remaining within the limits of all local, state and Federal Regulations for discharge. Precipitate both elements according to the following: inorganic compounds in a soluble state—1.0 ppm manganese removed for every 2.45 ppm of product above pH 7. 1.0 ppm iron removal for every 1.2 ppm of product above pH 5. Prepare a solution using the tablets of the invention according to use directions at 5 ppm.

Phenol Destruction

Must stay within all local, state and Federal Regulations for discharge. 1.0 ppm of phenol removed for 5 ppm of tablet concentration above pH 10 to Benzoquinone. 1.0 ppm of phenol removed for 5 ppm of product below pH 10 to Carboxylic Acids. Prepare a solution from the tablets of the invention according to instructions depending on the measured pH levels.

Cyanide Destruction

Must stay within all local, state and Federal Regulations for discharge. 1.0 ppm of Cyanide Ion removed for 5 ppm tablet concentration below pH 10 to Cyanate. Continuous treatment rate at 1-5 ppm. Treat intermittently at a rate of 5 ppm. Dosing is system dependent. Prepare product according to instructions. Prepare correct concentration depending on the measured pH levels.

Hydrogen Sulphide Scavenging

The tablets of the invention can prepare solutions that are an effective scavenger of hydrogen sulfide, when hydrogen sulfide is dissolved in water or in a gaseous state. The solutions of the invention are also a powerful scavenger of inorganic or organic sulfides. The solutions can be used in low and high temperature applications (max. 160° F.). It is non corrosive to equipment and does not form chlorinated hydrocarbons. The dosage rate varies with each location and local criteria. Determining optimum dose levels requires site-specific trials, optimum is 5 ppm. Prepare a solution from the tablets of the invention according to use directions at 5 ppm.

$NO_X$ Reduction and Emission Scrubbing $NO_X$ is a precursor to ozone in the atmosphere, and believed to be a contributor to acidic deposition (acid rain). $NO_X$ is produced in a variety of different processes, including combustion equipment, gas turbines, incinerators, kilns and power plants. Product can be used in a wet removal (stack rubber) process. The use of stoichiometric amounts of chlorine dioxide eliminates approximately 95% of the $NO_X$ in the gas, in concentrations of 20 ppm for short term. Prepare according to use directions at 20 ppm and apply in the scrubber system water for the specific application.

Shoe Bath

The solutions of the invention are effective as a shoe bath. Prepare 1-2 ounces of product, per 1 gallon of water. Shoe bath should be placed outside of the doorway. Change the solution daily or when the solution appears soiled.

Fungicide

The solutions of the invention are effective as a fungicide, to kill fungi on hard, non-porous surfaces. Prepare and apply a solution from the tablets of the invention according to use directions to 500 ppm, let stand for 1-minute contact time.

Control Buildup of Odor and Slime Forming Bacteria in Stainless Steel Transfer Lines and on-Line Equipment Such as Hydrocoolers, Pasteurizers, Etc.

Pre-clean the equipment or line thoroughly before treatment, using a suitable detergent followed by a clean potable water rinse. Prepare a solution from tablets of the invention containing 20 ppm of chlorine dioxide. Mix and fill lines and equipment overnight. Drain and allow to air dry just prior to next start-up.

Disinfect Water Storage Systems Aboard Aircrafts, Trains, Buses, Boats, RVs, Off-Shore Oil Rigs, Etc.

Tanks must be cleaned using a suitable detergent and thoroughly flushed with clean, potable water prior to treatment. Prepare the solution from tablets of the invention at 500 ppm as described above. Pour the solution into the tank, filling the tank completely. Bleed air out of lines and allow to stand at least 5 minutes. Drain tank and lines and flush with potable water Control Buildup of Odor and Slime Forming Bacteria in Commercial Water Filtration Systems, Sand Beds, Gravel Beds and Charcoal Filters, with Accessible Service Hatches Drain all existing water from sand and carbon filters and rinse once with clean, potable water. Fill sand filter with potable water. Create a solution of 250 ppm of chlorine dioxide and add to sand filter through access hatch. Fill system with clean potable water and circulate system 30 minutes. All systems are to soak two (2) to three (3) hours. After treatment, drain system and rinse with clean, potable water.

To Control Odor and Slime Forming Bacteria in Ice Making Plants and Machinery

Ice making machinery should be disassembled and thoroughly cleaned using a suitable detergent followed by a potable water rinse. The solution prepared from the tablets of the invention should be applied to the incoming water line of the ice machine via a chemical feed pump or injector system and proportioned at 20 ppm of chlorine dioxide.

Control the Buildup of Odor and Slime Forming Bacteria in Process Waters for Vegetable and Fruit Rinses and Associated Tanks, Flumes, and Lines All tanks, flumes and lines, etc. should be pre-cleaned with suitable detergent, followed by a rinse with clean, potable water. A solution prepared using the tablets of the invention of 5 ppm should be applied via a chemical feed pump or injector system to the equipment.

Control the Buildup of Odor and Slime Forming Bacteria in Cooling and Warming Water for Canning Retort, Pasteurizer, Etc.

All tanks, tunnels, conveyor chains, heat exchangers, heat exchange towers, lines, spray bars and nozzles must be thoroughly cleaned when possible, and completely rinsed using clean, potable water prior to treatment. Water systems, including the cooling and warming tanks or spray systems, towers, lines and all water containing parts of the system must be batch loaded at start-up. A solution prepared from the tablets of the invention of 5 ppm should then be applied via a controlled chemical feed pump.

EXAMPLES

Example 1

A tablet composition was produced using the following components as shown in Table 3.

TABLE 3

Components in tablet composition

| Ingredient | Molecular Formula | CAS NO. | Wt. % |
|---|---|---|---|
| Sodium Chlorite | $NaClO_2$ | 7758-19-2 | 24 |
| Magnesium Sulfate | $MgSO_4$ | 7487-88-9 | 10 |
| Sodium Percarbonate | $2Na_2CO_3 \cdot 3H_2O_2$ | 15630-89-4 | 3 |
| Sodium Sulfate | $Na_2SO_4$ | 7757-82-6 | 12 |
| Sodium Bisulfate | $NaHSO_4$ | 7681-38-1 | 40 |
| Polyvinyl pyrrolidone | $(C_6H_9NO)n$ | 84057-81-8 | 5 |
| Sodium Chloride | NaCl | 7647-14-5 | 5 |
| Silica | $SiO_2$ | 7631-86-9 | 1 |

The water content in each of these components was tested to ensure that each component was essentially dry. Afterwards, in a clean stirrer, 24 parts by weight of $NaClO_2$, and 5 parts by weight of polyvinyl pyrrolidone were added. The stirrer was shaken for 18 minutes.
Then 3 parts by weight of $2Na_2CO_3 \cdot 3H_2O_2$ and 10 parts by weight of $MgSO_4$ were added to the stirrer and stirred for 18 minutes to prepare the composite matrix.

The coating powder was produced by adding 12 parts by weight $Na_2SO_4$ and 40 parts by weight of $NaHSO_4$ in a separate container and stirred for 18 minutes. Then 5 parts by weight of NaCl and 1 part by weight of silica gel were added and stirred for 15 minutes. The coating powder was sealed and stored in plastic buckets if not used immediately.

The tablets were produced using a rotary pelleting machine. Tableting was carried out in a cool (15 Degrees Celsius), dry (less 30% humidity) and dark (no sun light or lamp bulb light) place. Three different sizes of tablets were produced:
  (1) 20 grams (0.71 oz.) tablets. 5 or 40 tablets were packed in an inner packaging, which was then packed in a hermetically sealed aluminum outer bag.
  (2) 1 gram (0.035 oz.) tablets. These smaller tablets may be packaged in 500 gram or one kilogram packages with an inner bag or a strip of aluminum and ACLAR® Plastic Materials from Honeywell. All inner bags or strips were packaged in a hermetically sealed aluminum outer bag.
  (3) 0.2 gram (0.0071 oz.) tablets. These tablets may be packed in bags or one by one inside a strip of aluminum and ACLAR® Plastic Materials from Honeywell. All inner bags or strips were packaged in a hermetically sealed aluminum outer bag.

The produced tablets were solid effervescent tablets having a white color. The tablets were odorless with a density of 2.0 g/cc. The decomposition temperature for the tablets was 120-212° C. The LD50 is above 200 mg/Kg. The aqueous solution produced by dissolving the tablets in water has pH 6-7.

Example 2

The tablets produced in Example 1 were used as follows. One 20 gram tablet was placed in 50 gallons of water to provide an aqueous solution with a concentration of 5 ppm chlorine dioxide or eleven 20 gram tablets were placed in 5000 gallons of water to produce an aqueous solution with a concentration of 1 ppm chlorine dioxide. After 1 minutes, effervescence was complete and the aqueous solution containing entrained $ClO_2$ microbubbles was ready for use. Six 1 gram tablets were placed in 1 quart of water to provide an aqueous solution with a concentration of 500 ppm chlorine dioxide or placed in 23 gallons of water to provide an aqueous solution with a concentration of 1 ppm chlorine dioxide. After 1 minute effervescence was complete and the aqueous solution containing entrained $ClO_2$ microbubbles was ready for use.

One 0.2 gram tablet was placed in 1 gallon of water to provide an aqueous solution with a concentration of 5 ppm chlorine dioxide or placed in 4.50 gallons of water to provide an aqueous solution with a concentration of 1 ppm chlorine dioxide. After 1 minute effervescence was complete and the aqueous solution containing entrained $ClO_2$ microbubbles was ready for use.

Example 3

The 20 gram tablets were tested using malonic acid iodometry to measure the amount of chlorine dioxide in aqueous solution. The reagents and materials used were the follows:
Water: distilled or deionized water KI: analytical reagent
$H_2SO_4$ solution: Volume $H_2SO_4$/Volume $H_2O$=1:1 (using $H_2SO_4$ concentrate of 98%)
Malonic acid solution: 100 g/L.
$In_2S_2O_3$ titration solution: =c 0.1 mol/L
Iodine-starch indicator: 5 g/L (expiration date: 2 weeks)
The $H_2SO_4$ solution was prepared by slowly adding 20 mL of $H_2SO_4$ (98%) to 20 mL chilled water. The malonic acid solution was prepared by dissolving 5.0 g of malonic acid in 35 mL of water, adding more water to bring the total volume of the malonic acid solution to 50 mL. The iodine-starch indicator (5 g/L) was prepared by dissolving 0.5 g of starch in 100 mL water, and boiling and cooling the solution. The iodine-starch indicator should be freshly-prepared every two weeks. The $In_2S_2O_3$ titration solution (0.1 mol/L) was prepared by adding 26.0 g of $Na_2S_2O_3 \cdot 5:O_2$ and 0.20 g of anhydrous $In_2CO_3$ to 1000 mL brown flask followed by stirring. The titration solution was kept out of direct sunlight.

The $In_2S_2O_3$ titration solution was calibrated as follows. 0.15 g $K_2Cr_2O_7$ was dissolved in 50 mL distilled water in a 250 mL iodine flask, followed by adding 15 mL of 2 mol/L $H_2SO_4$ solution and 10 ml of 200 g/L KI solution. The flask was covered and stirred and put in the dark for 10 minutes. 90 ml of distilled water was then added. 10 drops of 5 g/L of iodine-starch indicator was added and the solution turned blue at once. The solution from the flask was titrated with the $In_2S_2O_3$ solution to a yellow color at a temperature from 20° C. to 25° C. The volume ($V_1$) in mL of $In_2S_2O_3$ solution was recorded.

50 mL of distilled water was placed in a 250 ml iodine flask, followed by adding 15 mL of 2 mol/L $H_2SO_4$ and 10 mL of 200 g/L KI solution. The flask was covered and stirred. A small amount of distilled water was placed on the edge of the iodine flask cap. The flask was placed in the dark for 10 minutes. 90 mL of distilled water was then added, followed by adding 10 drops of 5 g/L of iodine-starch indicator to cause the solution to turn blue. The solution from the flask was titrated with the solution of $In_2S_2O_3$ to a light green color at a temperature between 20° C. and 25° C. $V_2$ (ml) of $In_2S_2O_3$ solution was recorded. The concentration of the $In_2S_2O_3$ solution was calculated as C (mol/L)=a/ (0.04903×($V_1$−$V_2$)), where a is the weight of $K_2Cr_2O_7$ (0.15 g).

To analyze the amount of $ClO_2$ generated from the 20 gram tablet of Example 1, the weight of the tablet m was obtained (accurate to 0.0002 g). The tablet was added to 1000 mL distilled water in a brown bottle with a lid. The tablet was not crushed to accelerate its dissolution in water. The brown bottle was covered and kept in a dark place for 10 minutes. The brown bottle was then shaken to thoroughly mix the solution within. In a 250 mL iodine flask, 100 mL of distilled water and 20 mL of the resultant solution of chlorine dioxide from the brown bottle were added. 3 mL of malonic acid solution was then added to the flask, which was covered and stirred, and placed in the dark for 3 minutes. 2.0 g of KI was then added to the flask, followed by adding 3 mL of $H_2SO_4$ solution. The flask was covered and stirred, and placed in the dark for 10 minutes.

The solution in the flask was titrated with the $In_2S_2O_3$ titration solution. 1-2 mL of iodine starch indicator was added when approaching the end point of the titration. The end point of the titration was the time when the color of the solution turned from red-brown to yellowish. The solution then turned blue. The blue solution was further titrated with the $In_2S_2O_3$ titration solution until the solution turned colorless. The amount of $In_2S_2O_3$ titration solution used was recorded as $A_0$ (ml). The amount of $ClO_2$ generated from the 20 gram tablet was calculated as:

$$ClO_2\text{-generated}=\{[(C/0.1)\times(A_0)\times1.50\times349]/(1000\times m)\}\times100\%$$

m is the weight of tablet (g),
C is the concentration of $In_2S_2O_3$ titration solution, and
1 mL of 0.1 mol/L titration solution of $Na_2S_2O_3$=1,349 mg of $ClO_2$.

Example 4

The 1 gram and 20 gram tablets produced in Example 1 were dissolved in distilled water to make an aqueous solution with a tablet concentration of 8 ppm. The entrained $ClO_2$ microbubbles in the aqueous solution were monitored over time. Specifically, the amount of $ClO_2$ in the aqueous solution was measured over a 14-day period starting 30 minutes after dissolving the tablet. The results are shown in Table 4.

TABLE 4

| | $ClO_2$ Concentration in Water | | | |
|---|---|---|---|---|
| | | Time after dissolving tablet | | |
| | | 3 hours | 2 days | 14 days |
| ClO2 concentration % (mg/L) | 8.94 (94.5 ± 23.62) | 9.83 (103.95 ± 25.99) | 10.21 (108.0 ± 27.0) | 9.79 (103.5 ± 25.88) |

The concentration of chlorine dioxide in the aqueous solution as generated by the tablet was at least about 10% of the tablet. It was also observed that the concentration of $ClO_2$ in the aqueous solution remained substantially constant over the entire measurement period of 14 days.

Example 5

Figure 2:
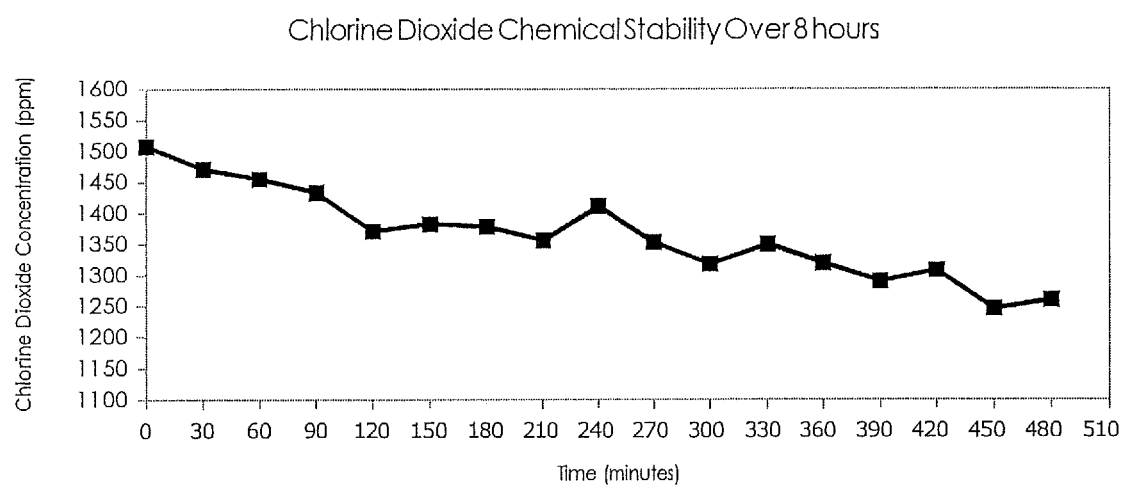
FIG. 2 shows a graph of the chlorine dioxide chemical stability in solution over 8 hours

When placed in water, the tablets produced 121 PPM per liter on average at the time of initial dissolution, with a range of 107-131 PPM. The separate chemical stability study showed that after 8 hours there was, on average, a 5.37% decay from initial levels. These results are shown in FIG. 2. Based on these results, a "worst case" tablet yields about 107 PPM, then decays by about 5% over 8 hours. Thus, a 100 PPM yield per tablet, per liter is a conservative estimate for dosing purposes. It follows, then, that 5 tablets should be added per liter or 6 tablets should be added per quart (to reach 500 ppm for 8 hours)

Preparation of Test Substance
  Sterile water was used to make AOAC 400 ppm synthetic hard water with a pH between 7.6-8.0.
  One ClO2 tablet was added to 250 ml of AOAC 400 ppm pH 7.6-8.0 hard water.
  The prepared test substance was placed in a dark room for 10 minutes.
  After 10 minutes in a dark room, the test substance container was inverted briefly to mix the solution.
  The test substance was analyzed using the Hach DR1900.
  The test substance was re-analyzed using the Hach DR1900 after 8 hours.

Test Substance Readings
  Initial analyses readings were performed using ten replicates per lot using the Hach DR 1900 spectrophotometer. ClO2 readings were recorded and averaged.
  In as separate test, three tablets per lot were analyzed as above, then allowed to sit undisturbed in a sealed, opaque bottle for 8 hours.
  Three replicates from each lot were re-analyzed using the Hach DR1900 after 8 hours and were recorded and averaged.
  The results are shown in Table 5 and FIG. 2.

TABLE 5

Initial readings immediately after test substance was prepared and test substance readings after 8 hours.

| Lot # | Time Point | Reading 1 (ppm) | Reading 2 (ppm) | Average Reading (ppm) | PPM per Liter, Per tablet | Average | Lowest Reading | Highest Reading | Max. Deviation (Low) | Max. Deviation (High) | % Difference From Initial Reading |
|---|---|---|---|---|---|---|---|---|---|---|---|
| 20150401 | Initial | 468 | 443 | 455.5 | 113.9 | 118.2 | 113.9 | 122.1 | 4.3 | 3.9 | N/A |
| | | 478 | 471 | 474.5 | 118.6 | | | | | | |
| | | 493 | 484 | 488.5 | 122.1 | | | | | | |
| 20150301 | Initial | 447 | 451 | 449 | 112.3 | 114.9 | 112.3 | 116.4 | 2.6 | 1.5 | N/A |
| | | 470 | 461 | 465.5 | 116.4 | | | | | | |
| | | 470 | 459 | 464.5 | 116.1 | | | | | | |
| 20150115 | Initial | 487 | 480 | 483.5 | 120.9 | 122.8 | 120.6 | 127.0 | 2.2 | 4.2 | N/A |
| | | 476 | 489 | 482.5 | 120.6 | | | | | | |
| | | 514 | 520 | 508 | 127.0 | | | | | | |

TABLE 5-continued

Initial readings immediately after test substance was prepared and test substance readings after 8 hours.

| Lot # | Time Point | Reading 1 (ppm) | Reading 2 (ppm) | Average Reading (ppm) | PPM per Liter, Per tablet | Average | Lowest Reading | Highest Reading | Max. Deviation (Low) | Max. Deviation (High) | % Difference From Initial Reading |
|---|---|---|---|---|---|---|---|---|---|---|---|
| 20150401 | 8 hours | 439 | 437 | 438 | 109.5 | 112.0 | 109.5 | 114.6 | 2.5 | 2.6 | 5.29% |
|  |  | 445 | 449 | 447 | 111.8 |  |  |  |  |  |  |
|  |  | 461 | 456 | 458.5 | 114.6 |  |  |  |  |  |  |
| 20150301 | 8 hours | 430 | 424 | 427 | 106.8 | 108.3 | 106.8 | 110.0 | 1.5 | 1.7 | 5.73% |
|  |  | 444 | 436 | 440 | 110.0 |  |  |  |  |  |  |
|  |  | 437 | 429 | 433 | 108.3 |  |  |  |  |  |  |
| 20150115 | 8 hours | 458 | 453 | 455.5 | 113.9 | 116.6 | 13.5 | 122.5 | 3.1 | 5.9 | 5.05% |
|  |  | 460 | 448 | 454 | 113.5 |  |  |  |  |  |  |
|  |  | 491 | 489 | 490 | 122.5 |  |  |  |  |  |  |

TABLE 6

The following is STORAGE STABILTY test results, at 3 months.
3 Month Interval: % Sodium Chlorite

| Tablet | Replicate 1 | Replicate 2 | Average |
|---|---|---|---|
| 1 | 20.0% | 20.0% | 20.0% |
| 2 | 20.1% | 20.0% | 20.0% |
| 3 | 20.1% | 20.1% | 20.1% |
| Average of All Tablets |  |  | 20.0% |

Stability Data:

Titrations were performed in double replicate using a Hach DR1900 spectrophotometer. $ClO_2$ readings were recorded, averaged, and then graphed
1. Recordings were made at 30 minute intervals over an 8 hour period.
2. The test substance was prepared at a starting concentration of 1508 ppm. The diluent for the provided chlorine dioxide tablets was chlorine demand free water with a pH between 7.0-7.2.
Test substance was prepared in chlorine demand free glassware.
3. Once prepared the test substance was allowed to sit undisturbed in a bottle completely covered with foil and the cap was left ajar for the duration of the observation period. The results are shown in FIG. 2.

TABLE 7

Time (minutes)

| Observation Interval (Minutes) | Average ClO Reading (ppm |
|---|---|
| 0 | 1508 |
| 30 | 1471 |

TABLE 7-continued

Time (minutes)

| Observation Interval (Minutes) | Average ClO Reading (ppm |
|---|---|
| 60 | 1455 |
| 90 | 1433 |
| 120 | 1371 |
| 150 | 1383 |
| 180 | 1378 |
| 210 | 1356 |
| 240 | 1411 |
| 270 | 1353 |
| 300 | 1318 |
| 330 | 1350 |
| 360 | 1320 |
| 390 | 1290 |
| 420 | 1308 |
| 450 | 1246 |
| 480 | 1260 |
| 1440 | 1142 |

*An additional reading was taking at 1,440 minutes (24 Hours) and read as 1142 ppm.

Example 6

The disinfecting effect of the tablets produced in Example 1 was tested on common bacteria. Six 1 gram tablets were dissolved in 1 quart of water, producing an aqueous solution of 500 ppm solution containing entrained chlorine dioxide microbubbles. The effects of the aqueous solution on pathogens are presented in Table 8.

Example 7

The aqueous solution at specified concentrations made from tablets of the present invention was effective in eliminating pathogens listed in Table 8 in the specified time in minutes.

TABLE 8

US GLP Test Results

| Advanced Biocide Technologies Inc. is proven effective as a disinfectant against the following pathogens | Contact Time in Minutes | Use Concentration of |
|---|---|---|
| EPA GLP AOAC HARD SURFACE DISINFECTION TESTS | | |
| Staphylococcus aureus ATCC 6538 [S. aureus] | 5 | 500 ppm |
| Methicillin Resistant Staphylococcus aureus ATCC 33591 [MRSA] | 5 |  |
| Pseudomonas aeruginosa ATCC 15442 [P. aeruginosa] | 5 |  |
| Enterococcus faecalis [E. faecalis] ATCC 51299 [VRE] | 5 |  |
| Escherichia coli ATCC BAA-2469 [CRE] | 5 |  |

TABLE 8-continued

US GLP Test Results

| Advanced Biocide Technologies Inc. is proven effective as a disinfectant against the following pathogens | Contact Time in Minutes | Use Concentration of |
|---|---|---|
| *Salmonella enterica* ATCC 10702 [*S. enterica*] | 5 | |
| *Listeria monocytogenes* ATCC 49594 [*L. monocytogenes*] | 5 | |
| Feline calicivirus, Strain F-9 ATCC VR-782 [Norovirus] | 1 | 500 ppm |
| Influenza A [H1N1]/Virginia/ATCC1/2009, ATCC VR-1736 | 1 | |
| *Trichophyton interdigitale* ATCC 9533 [*T. Ment.*] [Athletes Foot Fungus] | 1 | |
| *Elizabethkingia meninogoseptica* ATCC 13253 [*Elizabethkingia anophelis*] | 1 | |
| *Klebsiella pneumoniae* ATCC BAA-2146 (CRE) | 1 | |
| AOAC HARD SURFACE DISINFECTION TESTS | | |
| *Clostridium difficile* ATCC 43598 [*C. diff*] | 5 | 2,600 |
| FDA GLP AOAC DISINFECTION AND STERILIZATION TESTS | | |
| *Bacillus subtilis* [*B. subtilis*] | 60 | 200 ppm |
| *Mycobacterium terrae* [*M. terrae*] | 7 | 400 |
| AOAC USE DILUTION DISINFECTION TESTS (in solution) | | |
| *Vibrio cholerae* [*V. cholerae*] ATCC 39050 | 5 | 10 |
| Zika Virus, ATTC VR-1838 | 1 | 500 |

Example 8

TABLE 9

Acute Inhalation, Oral and Dermal Toxicity
Acute toxcity

| Product name | Acute Toxidty Result | Species | Dose | Acute Toxicity Category |
|---|---|---|---|---|
| Tablet of the present invention | LC50 Inhalation | Rat | 0.29 mg/L | II |
| | LD50 Oral | Rat | 292 to 340 mg/kg bw | III |
| | LD50 Dermal | Rabbit | >10,000 mg/kg | III |

Example 9

The aqueous solutions were tested on microorganisms. A total of 110 local bacteria and yeast isolates from various animals and human origins were used in this test. It was found that, in clean diluent condition, the median lethal concentration of the aqueous solution against bacteria and yeast was 9.4 and 8.4 ppm, respectively. In dirty diluent conditions the median lethal concentration of the aqueous solution against bacteria and yeast was 39.9 and 24.3 ppm, respectively. In clean conditions, the diluent for the disinfectant was a sterile double distilled water. In dirty condition, the diluent for the disinfectant was a sterile yeast hard water suspension containing 5% dry weight of baking yeast, 0.0304% of calcium chloride, and 0.139% of magnesium chloride in double distilled water as described in the British Standard Method (British Standard, 808:1938).

Note the median lethal concentration was determined as the concentration of the solution that killed 50% of the bacteria or yeast cultures tested; if a simple concentration did not kill exactly 50% of the cultures, a proportional distance, using the concentration above or below the 50% lethal level was calculated. The median embryo lethal dose was determined by making serial ten-fold dilutions of the virus suspension with minimum essential medium.

Aqueous solutions (with concentrations) for various applications for medical, farm, agriculture, shipping, cruise ships, institutional buildings, public and government facilities and many other applications are shown in Table 10. Data is from EPA registration of Biotab7 tablets in accordance with the present invention US EPA #91399-2 and US EPA 91399-(Amendment). Product is prepared as stated in Use Application.

TABLE 10

| Application | Contact Time | PPM | Special Instructions |
|---|---|---|---|
| Green: Very Low Strength | | | |
| Orange: Moderate Strength | | | |
| Blue: Hospital Grade Disinfection | | | |
| Gold: High Strength | | | |
| HOSPITAL AND MEDICAL | | | |
| Hospital/Health Care Facility | 5 | 500 | |
| Veterinary | 5 | 500 | |
| Hard, Non-Porous, Non-Food Contact | 5 | 500 | |
| Bench Tops, Biological Hoods, Incubators, Stainless Steel Equipment and Instruments | 5 | 500 | |
| Odor Removal | 5 | 500 | |
| Deodorize Animal Holding Rooms. Morgues, Sick Rooms, and Work Rooms | 5 | 500 | |

TABLE 10-continued

| Application | Contact Time | PPM | Special Instructions |
|---|---|---|---|
| AGRICULTURE AND FOOD PROCESSING | | | |
| Retention Ponds | N/A | 2-5 | |
| Poultry Drinking Water Stage 2 | N/A | 5 | |
| Farm Water | N/A | 5 | |
| Nematode Worm Eradication | 4 Hours | 5 | |
| Potato Rinse Tank | N/A | 5 | |
| Fruit and Vegetable Rinse | 10-20 Seconds | 5 | |
| Decorative Pools, Ponds, Water Display | N/A | 5-10 | |
| Poultry Drinking Water Stage 1 | N/A | 20 | 1-2 Weeks |
| Hard, Non-Porous Food Contact | 1 | 100 | |
| Potato Facility | 10 | 100 | |
| Evaporative Cooler | N/A | 250 | Every 14 days |
| Incubator Humidification System | N/A | 300 | |
| Agriculture Irrigation System Cleaning | N/A | 300 | |
| Odor and Slime in Animal Confinement Facility | N/A | 500 | Use Commercial Sprayer |
| Foam Solution | 10 | 500 | |
| Transportation, Loading, Hauling Equipment | 5 | 500 | |
| Pots and Flats | 10 | 500 | |
| Cutting Tools | N/A | 500 | |
| Bulbs | 10 | 500 | |
| Dairy Facility | 5 | 500 | |
| Farm Equipment, Animal Housing, Barns | 5 | 1000 | |
| HUMAN WATER SYSTEM | | | |
| Municipal Well Water | N/A | 1 | NSF Certified |
| Well Water | N/A | 5 | NSF Certified |
| Well Water Backwash | N/A | 20 | |
| SWIMMING POOLS | | | |
| Swimming and Wading Pool Filter | 5 | 500 | |
| RESIDENTIAL AND PUBLIC ACCESS | | | |
| Animal Bath | N/A | 100 | |
| Restrooms, Refuse Containers, Storage Locker Deodorizer | 5 | 250 | |
| Carpet | N/A | 500 | Add to rug shampoo mix |
| Pet Litter Box | Overnight | 650 | |
| Concrete Floors | N/A | 1250 | |
| INDUSTRIAL | | | |
| Cooling Tower Water Continuous Dose | N/A | 1 | |
| Water Based Cutting Fluid/Oil | N/A | 2 | Weekly |
| Pulp and Paper Mills | N/A | 5 | |
| Water Based Cutting Fluid/Oil High Contamination | 12 hours | 20 | |
| Cooling Tower Water Slug Dose | N/A | 200 | |
| Flush Water Distribution System | 10 | 250 | |
| Car, Train, Truck Wash Water | 5 | 500 | |
| Oil and Gas Industry | N/A | 5000 | |
| NON REGULATED APPLICATIONS | | | |
| Waste Water Treatment | N/A | 1-5 | |
| Egg Handling Non Food Use | N/A | 5 | Use Commercial Sprayer |
| Phenol Destruction | N/A | 5 | |
| Iron and Manganese Removal | N/A | 5 | |
| Cyanide Destruction | N/A | 5 | |
| Hydrogen Sulphides Scavenging | N/A | 5 | |
| NOX Reduction | N/A | 20 | |
| Storage Tanks and Pipelines | 5 | 500 | |
| Hot Tubs and Spa Pipes and Lines | 5 | 500 | |

Example 11

A composition for generating chlorine dioxide in oil wells was produced. The composition may be used for oil well stimulation by releasing chlorine dioxide gas in the wells and producing strong oxidation to reduce the explosion or strong corrosion risk inside the pipe that may cause production delay and serious injury to the respiratory tract of oil workers.

The composition is a non-tablet composition made up of three packages whose contents are mixed right before use.

Package A contains powders of 6.4 kg of sodium chlorite, 0.24 kg of sodium chloride, 0.96 kg of sodium carbonate, 0.24 kg of magnesium sulphate and 0.16 kg of sodium tripolyphosphate.

Package B contains powders of 19.8 kg of ammonium chloride, 1.1 kg of ammonium sulfate, 0.66 kg of silica gel and 0.44 kg of poly (beta-(1-4)-2-amino-2-deoxy-d-glucose) chitosan.

Package C contains a liquid with 6.0 kg of alkyl polyglucoside, 5.0 kg of 2-hydroxybutanedioic acid, 3.0 kg of potassium phosphate monobasic and 6.0 kg of distilled water.

The content of the three packages may be mixed in a ratio of package A (powder)/package B (solid powder)/package C (liquid)=(A:8 kg/B:22 kg I/B:20 kg). A mixture thus produced is added to 950 kg water to produce a water solution, which is then injected into oil wells. The solution will generate chlorine dioxide in the oil wells to remove the plugging agents in the wells and pipelines.

Example 12

A tablet composition was produced following the same process as described in Example 1, except using the following components as shown in Table 12, where the polyvinyl pyrrolidone of the composition of Example 1 was replaced by sodium alginate.

TABLE 11

Components in tablet composition

| Ingredient | Molecular Formula | CAS NO. | Wt. % |
|---|---|---|---|
| Sodium Chlorite | $NaClO_2$ | 7758-19-2 | 24 |
| Magnesium Sulfate | $MgSO_4$ | 7487-88-9 | 10 |
| Sodium Percarbonate | $2Na_2CO_3 \cdot 3H_2O_2$ | 15630-89-4 | 3 |
| Sodium Sulfate | $Na_2SO_4$ | 7757-82-6 | 12 |
| Sodium Bisulfate | $NaHSO_4$ | 7681-38-1 | 40 |
| Sodium Alginate | $(C_6H_8O_6)n$ | 9005-32-7 | 5 |
| Sodium Chloride | NaCl | 7647-14-5 | 5 |
| Silica | $SiO_2$ | 7631-86-9 | 1 |

Example 13

A batch of tablets were prepared using the following procedure. All raw materials except sodium alginate should have a moisture content that does not exceed 0.3%. Into a mixing vessel (1500-L, stainless steel), sodium alginate (25 kg) binder is mixed with 1,250 L deionized water to provide a binder solution. The binder solution is heated from the bottom using hot air in fluidized bed coating machine until completely dissolved and homogeneous.

Sodium chlorite powder (120 kg) is fed to a fluidized bed coating machine and coated with the binder solution described above by side spraying. The drying temperature is controlled so as to be not greater than 100° C. The process involves simultaneous coating and drying until the desired coating thickness is achieved and coated sodium chlorite particles are produced, then mixing thoroughly for 30 minutes. The moisture content of the coated sodium chlorite particles is about 1%.

Addition of Effervescent and Desiccant Agents

Sodium percarbonate (15 kg) and magnesium sulfate (50 kg) are added to a pellet coater containing the coated sodium chlorite particles to create an active ingredient precursor coating. This combination is mixed well for 10-20 minutes until the mixture reaches a uniform consistency.

Addition of Passivating Agent and Acid Source

The passivating agent, sodium sulfate (60 kg) and the acid source, sodium bisulfate (195 kg), are then added to the pellet coater to create a light shielding outer-layer coat on the particles. The solids are mixed for 10-20 minutes until mixture reaches a uniform consistency.

Addition of Binder and Mold Release Agent

In the final formulation step, the binder sodium chloride (25 kg) and the mold release agent silica gel (5 kg) are added to the mixture and mixed well for 10-15 minutes until mixture reaches homogeneity.

Tableting

Once the solids are well mixed, the resulting solid mixture is compressed using a rotary tablet press using a compression force of about 25-100 kN. The relative humidity of the environment should not exceed 40%. The tablets typically weigh 20 g each +/−5%.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. A tablet that will generate and release microbubbles of chlorine gas when exposed to water, wherein said tablet comprises a core and an outer coating,
   wherein said core comprises, based on total weight of said core:
   (a) 35-90 wt % of an alkali metal chlorite or alkaline earth metal chlorite that will produce gaseous chlorine dioxide upon contact with an acid;
   (b) 1-20 wt % of a polyvinylpyrrolidone binder that will dissolve in water;
   (c) 1-15 wt % of an effervescent agent selected from the group consisting of water-soluble percarbonates, and water-soluble bicarbonates that generate microbubbles upon contact with water;
   (d) 5-25 wt % of a desiccant;
   wherein said core is a homogeneous dispersion formed by mixing components (a)-(d); and
   wherein said coating comprises, based on total weight of said coating:
   (e) 60-95 wt % of an acid source comprising sodium bisulfate;
   (f) an acid stabilizer in an amount sufficient to prevent or inhibit said acid source from releasing protons before said tablet comes into contact with water, wherein the acid stabilizer is a salt of the acid source with fewer protons; and
   (g) a demolding agent in an amount sufficient to facilitate release from a tablet mold,
   whereby contacting said tablet with water allows the metal chlorite to contact the acid and thereby produce gaseous chlorine dioxide that is carried by microbubbles formed by the effervescent agent into the water and which remain entrained therein for at least 3 days.

2. A tablet according to claim 1, wherein said pellet core comprises:
   (a) 35-90 wt % of sodium chlorite;
   (b) 1-20 wt % of the polyvinylpyrrolidone binder;
   (c) 1-15 wt % of the effervescent agent comprising sodium percarbonate;
   (d) 5-25 wt % of the desiccant comprising magnesium sulfate; and
   wherein said coating comprises, based on total weight of said coating:
   (e) 60-95 wt % of the acid source comprising sodium bisulfate;

(f) the acid stabilizer comprising sodium sulfate;
(g) the demolding agent; and
(h) a low solubility amorphous material comprising silica gel.

3. A tablet according to claim 2 that comprises: sodium chlorite, magnesium sulfate, sodium percarbonate, sodium sulfate, sodium bisulfate, polyvinylpyrrolidone, sodium chloride, and silica.

4. A tablet according to claim 3 that comprises:

| Ingredient | Wt % (based on total weight) |
|---|---|
| sodium chlorite | 24 |
| magnesium sulfate | 10 |
| sodium percarbonate | 3 |
| sodium sulfate | 12 |
| sodium bisulfate | 40 |
| polyvinylpyrrolidone | 5 |
| sodium chloride | 5 |
| Silica | 1. |

5. A tablet according to claim 4 wherein said tablet generates chlorine dioxide at a rate of about 2 grams of chlorine dioxide gas, per 20 g of tablet, in about 3 minutes.

* * * * *